United States Patent
Grzybowski et al.

[11] Patent Number: 5,818,242
[45] Date of Patent: Oct. 6, 1998

[54] MICROWAVE RECESS DISTANCE AND AIR-PATH CLEARANCE SENSOR

[75] Inventors: Richard R. Grzybowski, Plantsville; Gerald Meltz, Avon, both of Conn.

[73] Assignee: United Technologies Corporation, Hartford, Conn.

[21] Appl. No.: 646,577

[22] Filed: May 8, 1996

[51] Int. Cl.⁶ ................................... G01R 27/04
[52] U.S. Cl. ................ 324/642; 314/644; 415/14
[58] Field of Search .................... 324/637, 642, 324/644; 342/127, 458; 415/14

[56] References Cited

U.S. PATENT DOCUMENTS

| | | | |
|---|---|---|---|
| 3,973,259 | 8/1976 | Hellgren et al. | 342/86 |
| 4,045,727 | 8/1977 | Yu et al. | 324/644 |
| 4,180,329 | 12/1979 | Hildebrand | 356/375 |
| 4,326,804 | 4/1982 | Mossey | 356/375 |
| 4,346,383 | 8/1982 | Woolcock et al. | 324/644 |
| 4,359,683 | 11/1982 | Chivers | 324/644 |
| 4,384,819 | 5/1983 | Baker | 324/644 |
| 4,632,635 | 12/1986 | Thomam et al. | 415/14 |
| 4,845,422 | 7/1989 | Damon | 324/642 |
| 4,862,061 | 8/1989 | Damon | 324/642 |
| 5,459,405 | 10/1995 | Wolff et al. | 324/644 |

FOREIGN PATENT DOCUMENTS

| 1277748 | 6/1972 | United Kingdom | G01P 13/00 |
|---|---|---|---|
| 2 063 001 | 4/1984 | United Kingdom | G01S 13/36 |

*Primary Examiner*—Vinh P. Nguyen
*Assistant Examiner*—Diep Do
*Attorney, Agent, or Firm*—Gerald L. DePardo

[57] ABSTRACT

A machine having protruding elements 26 and an adjacent abradable seal 18, which move relative to each other, an air-path clearance G between the seal 18 and the elements 26 and an element distance D2 between the sensor 10 and the elements 26, is provided with a sensor 10 which is recessed within the seal 18 by a recess distance D. A clearance/thickness circuit 14 provides transmitted and reflected microwave signals 30,32 along a coaxial cable 12 having a characteristic impedance, to the sensor 10, which has an impedance substantially matched to the characteristic impedance of the cable 12. The sensor 10 provides the reflected signal 32 which is indicative of the recess distance D when the elements 26 are not in front of the sensor 10 and is indicative of the blade distance D2 between the sensor 10 and the elements 26 when the elements 26 are in front of the sensor 10. The circuit 14 receives the reflected signal 32 and provides electrical signals indicative of the recess distance D and/or the air-path clearance G. Alternatively, the circuit 14 may provide only the recess distance D. The sensor 10 provides such measurements whether or not the machine is operating.

8 Claims, 4 Drawing Sheets

MICROWAVE RECESS DISTANCE AND AIR-PATH CLEARANCE SENSOR

TECHNICAL FIELD

This invention relates to air-path clearance sensors and more particularly to microwave air-path clearance sensors.

BACKGROUND ART

It is known in the art of aircraft engines and other machines having movable or rotating blades or toothed elements within a seal or liner (e.g., the portion of an engine case closest to the blades), that it is desirable to measure the gap between the outer edge (or periphery) of the blade tip and the inner surface of the seal. This gap is referred to as the air-path (or blade-tip) clearance.

In particular, for a gas turbine engine, it is desirable to minimize the air-path clearance in order to optimize flow and efficiency of the engine. Accordingly, in some engines the seal annulus is adjusted to minimize the air-path clearance, thereby maximizing efficiency.

Also, various transient displacements of the blade tip which occur during a forced vibration, a flutter condition, a stall or surge of the engine, or other flow path instabilities, may transiently change the air-path clearance and/or rub away the seal surface and thus permanently increase the air-path clearance. Such temporary or permanent changes in air-path clearance cause the flow to be altered, thereby reducing the efficiency of the engine.

One common technique for measuring air-path clearance uses an array of capacitive sensors distributed around the annulus of the seal. However, capacitive sensors do not accurately measure the air-path clearance between blade tip and the seal because they do not detect changes in the seal thickness. In particular, the sensor is recessed a predetermined distance into the seal to prevent the sensor from being damaged by contact with the blades as the seal wears. However, the sensor only measures the distance between the sensor and the blade tip. Thus, changes in seal thickness (between the sensor tip and the surface of the seal) are not measured and thus not accounted for.

Other techniques which measure air-path clearance or detect rub include eddy current, magnetic reluctance, optical, pneumatic, x-ray, and touch probes. However, such techniques also do not detect the clearance between the blade tip and the seal. Also, these techniques do not provide the required capability because they cannot be used at high temperatures, they need recalibration during their use to adjust for changes in the seal thickness, or they cannot be used in an operating engine.

Thus, it would be desirable to provide a non-intrusive method for determining blade-tip (or air-path) clearance.

DISCLOSURE OF INVENTION

Objects of the present invention include provision of a non-intrusive air-path clearance sensor.

According to the present invention an air-path clearance sensor for a machine having protruding elements and an adjacent abradable seal, which are movable relative to each other, there being an air-path clearance between the seal and the elements and an element distance between the sensor and the elements, and the sensor being recessed within the seal by a recess distance, comprises signal processing means, for providing a microwave transmission signal; transmission means, electrically connected to the signal processing means and having a characteristic impedance, for propagating the microwave transmission signal; sensor means, electrically connected to the transmission means, having an impedance substantially matched to the characteristic impedance of the transmission means, for receiving the transmission signal and for providing a reflected microwave signal onto the transmission means indicative of the recess distance when the elements are not in front of the sensor means; the transmission means propagating the reflected microwave signal; and the signal processing means comprising means for receiving the reflected microwave signal and for providing an electrical signal indicative of the recess distance.

According further to the present invention, the reflected microwave signal from the sensor means is indicative of the element distance when the movable elements are in front of the sensor means; and the signal processing means comprises means for providing an electrical signal indicative of the air-path clearance.

The present invention represents a significant improvement over the prior art by providing a non-intrusive sensor which accurately determines the distance between the blade tip and the inner surface of the seal (i.e., air-path clearance). Another advantage of the present invention is that a coaxial cable may be used instead of hollow waveguides, thereby making the design lightweight, less expensive, and less lossy which results in reduced power requirements.

Also, the invention can detect and measure the amount of wear (or thickness) of the seal directly. Further, the invention can be used either when the engine is operating or when it is not operating.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
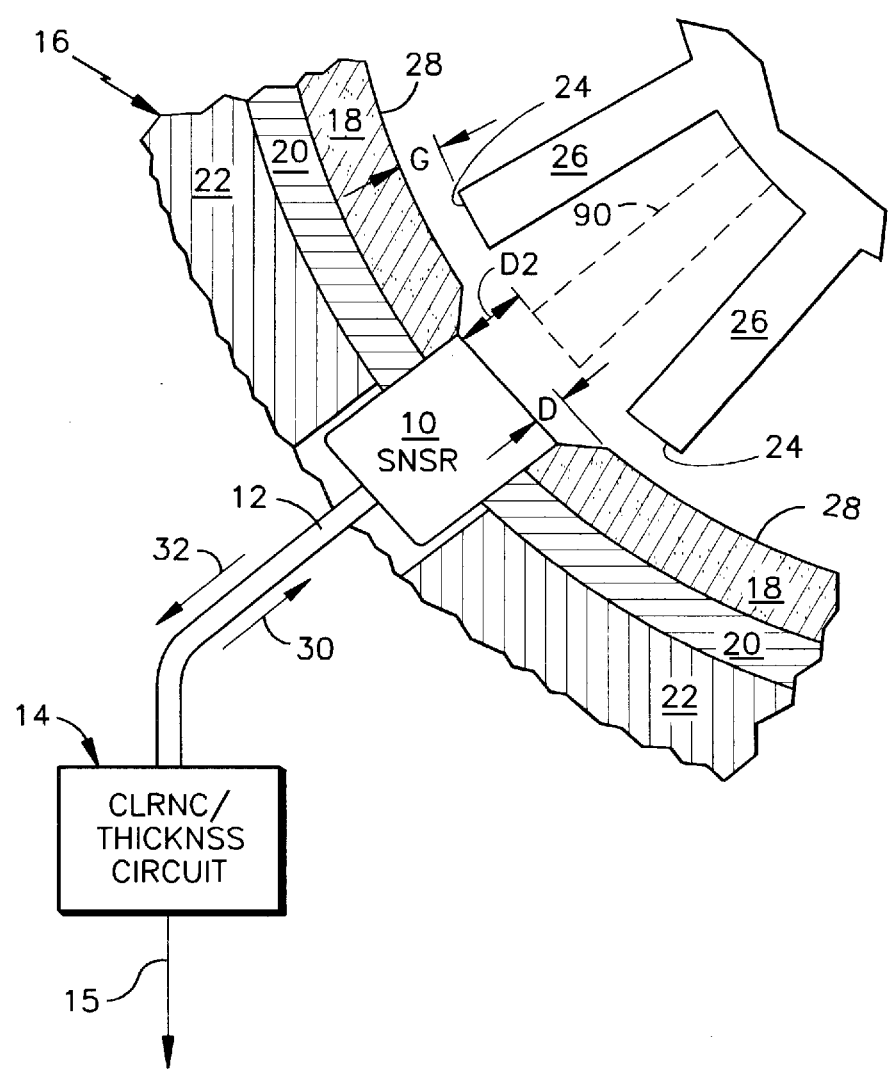
FIG. 1 is a schematic block diagram of an air-path (or blade tip) clearance sensor, a clearance/thickness circuit and electrical connections therebetween, in accordance with the present invention.

Referring now to FIG. 1, a microwave air-path (or blade-tip) clearance sensor system comprises a microwave air-path clearance sensor 10 which is connected to one end of a coaxial cable 12, e.g., a standard coaxial microwave transmission line, having a characteristic impedance of approximately 50 ohms. The coaxial cable 12 allows a transmit (or excitation) microwave signal 30 to be transmitted to the sensor 10 and a receive (or return or reflected) microwave signal 32 to be received from the sensor 10. The coaxial cable 12 is connected on the other end to a clearance/thickness circuit 14 which provides and receives the microwave signals 30,32 to and from the sensor 10, respectively. Other coaxial cables or transmission mediums and/or impedances may be used if desired.

The sensor 10 is mounted in a case (or casing) 16 of an engine. The inner-most region of the engine case 16 comprises an abradable seal 18 (i.e., a seal capable of rubbing or wearing away) made of an abradable high temperature electrically conductive metal, and a seal back plate 20 made of a high temperature electrically conductive material, e.g., Inco 718 (comprising nickel, cobalt and steel). The seal 18 and the plate 20 each have a thickness of about 0.1 inches (2.54 mm). Other thicknesses and materials may be used for the seal 18 and plate 20. The remaining outer portion of the case 16 is indicated by a numeral 22 and may comprise many sections and layers of materials as is known. Other materials for the seal 18 may be used if desired. Also, the regions 18,20,22 may be made of the same material or more than one material if desired.

The sensor 10 is recessed within an inner surface 28 of the abradable seal 18 by a predetermined recess distance or thickness D, e.g., 25–50 mils (0.635–1.27 mm). Other distances may be used for the distance D, if desired. As the seal 18 wears, the recess distance D decreases. To avoid blade contact with the sensor 10, the distance D should be set to be greater than the maximum distance that the seal 18 will be allowed to wear before replacement of the seal 18.

The sensor 10 detects the amount of wear of the seal 18 which occurs, i.e., the reduction in the thickness D. Also, the sensor 10 detects the air-path clearance (G) between a tip 24 of a blade 26 and the inner surface 28 of the seal 18 (as discussed hereinafter).

Figure 2:
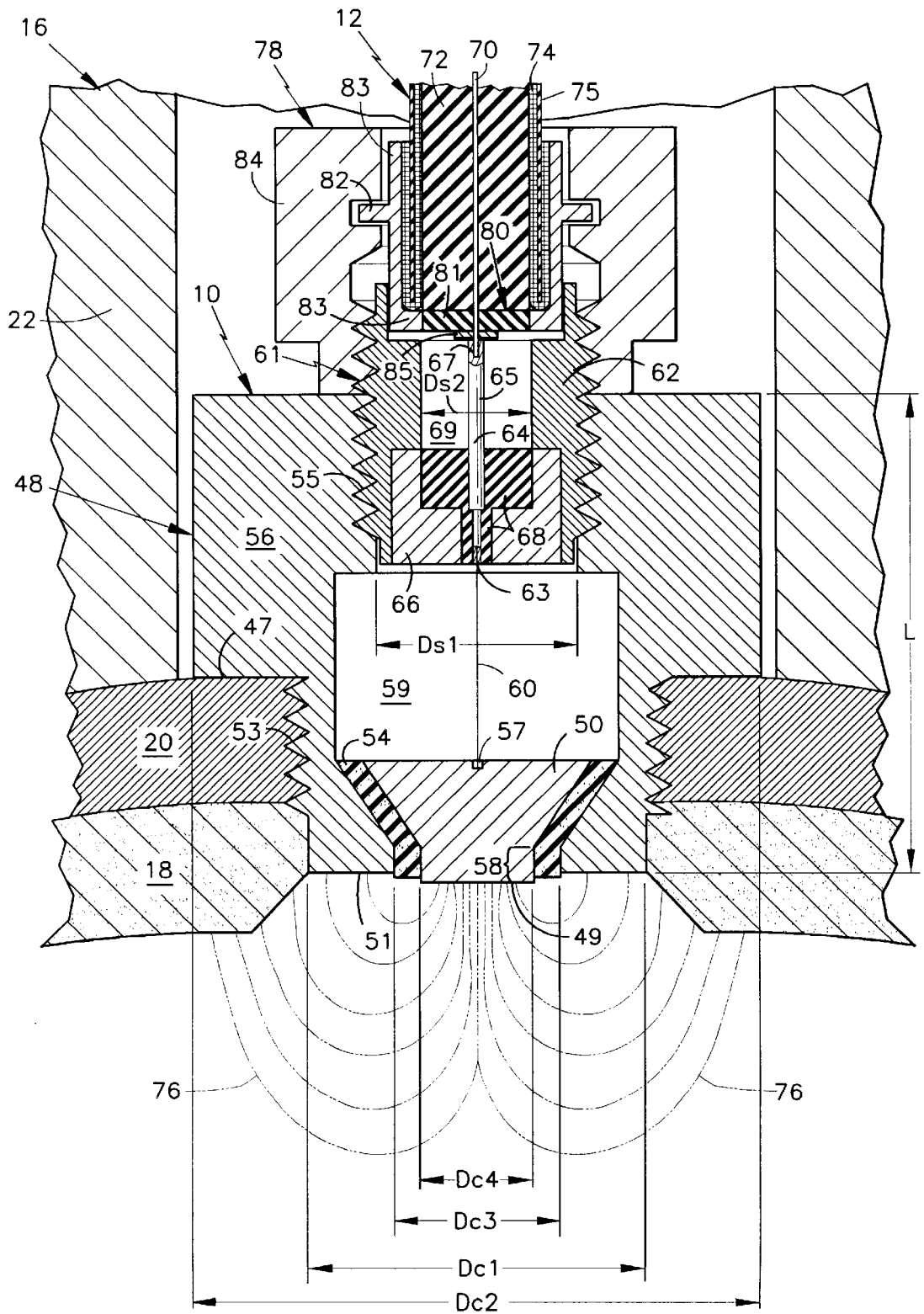
FIG. 2 is a side cutaway view of an air-path (or blade tip) clearance sensor when no blade is in front of the sensor, in accordance with the present invention.

Referring now to FIG. 2, the sensor 10 comprises a sensing assembly 48, a spark plug assembly 61, and an electrical connecting wire 60 connecting the two assemblies 48,61. The sensing assembly 48 comprises a center conductor 50 which is electrically connected to a center conductor 70 of the coaxial cable 12 (as discussed hereinafter). Outside and concentric with the conductor 50 is an insulator 54 made of a high temperature ceramic, such as alumina. Outside and concentric with the insulator 54 is an electrically grounded outer conductor 56. The sensing assembly 48 is connected to the plate 20 by screw threads 53 and connected to the spark plug assembly 61 by threads 55. Instead of the threads 53, the sensor 10 may be inserted through a hole in the plate and seal 18 and the outer portion 22 of the engine case 16 may be partially threaded to accept the sensor 10. The sensor 10 may be fitted with a seal, such as air tight threading tape or a gasket at an interface 47 between the upper surface of the plate 20 and the assembly 48, so as to minimize leakage through the seal 18. Other techniques may be used to minimize leakage if desired. Also, the inner conductor 50, the insulator 54, and the outer conductor 56 may be bonded together with an adhesive, such as a ceramic adhesive, to minimize movement. Alternatively, the length L of the outer conductor 56 may be long enough such that it extends out beyond the outer region 22 of the casing 16. Other techniques for affixing the sensor 10 into the seal 18 may be used if desired.

The dimensions of the inner conductor 50, the insulator 54, and the outer conductor 56 may be selected, in conjunction with the choice of microwave frequency, to: (1) avoid higher order radial and circumferential propagating electromagnetic modes; (2) suppress electromagnetic radiation from the open end of the sensor 10 (facing the blades 26); (3) reduce direct coupling between the inner conductor and the outer conductor which would reduce fringing electric fields; and/or (4) maximize the sensitivity of the sensor 10 to the blades 26 over the expected range of air gaps (G) without introducing excessive losses. Such characteristics are not required but provide best performance.

For example, for a 20 GHz sensor excitation, the outer conductor 56 is a hollow tapered cylinder and has outer diameters Dc1,Dc2 of about 0.9 cm and 1.5 cm, respectively. The larger outer diameter Dc2 provides a stop for the insertion of the sensor 10. If desired, the outer conductor 56 may have one common outer diameter Dc1 instead of two different outer diameters Dc1,Dc2. The inner diameter Dc3 of the outer conductor 56 near the conductor 50 (which is also the outer diameter of the insulator 54) tapers down from a value of about 6 mm down to about 5 mm. The center conductor 50 is a solid tapered cylinder and has a diameter Dc4 (which is also the inner diameter of the insulator 54) of about 4 mm at the widest point and tapers to about 3 mm. The length of a straight portion 58 is about 1 mm and the angle of taper is about 30° from the vertical. The taper helps keep the inner conductor 50 and insulator 54 from falling out of the outer conductor 56. The overall length L of the outer conductor 56 is about 17 mm. Other lengths, angles and dimensions may be used if desired.

The insulator 54 protrudes toward the blades 26 a distance of about 1 mil (0.0254 mm) from a lower face 51 of the outer conductor 56. Also, The inner conductor 50 protrudes toward the blades 26 a distance of about 2 mils (0.05 mm) from the lower face 51 of the outer conductor 56. Such protrusion of the inner conductor 50 and the insulator 54 is not required but helps increase the sensing range of the sensor by increasing the extension of the fringing electric fields.

Other dimensions and shapes for the parts 50,54,56 may be used if desired. Generally, the higher the excitation frequency, the smaller the allowable dimensions. Also, in general, the larger the surface area of the face 49 of the conductor 50 facing the blades 26, the more intense and the larger the extension of the fringing fields 76, and the more resolution and sensitivity to changes in seal thickness and air-gap clearance.

The connecting wire 60 is an electrically conductive wire which extends from a small insertion hole 57 in the top side of the conductor 50 to the bottom side of the spark plug assembly 61. A region 59 around the wire 60 between the wire 60 and the inner diameter of the outer conductor 56 is air. The wire 60 is about 7 mm long and has a diameter of about 0.64 mm (8 mils). Other lengths and diameters may be used if desired for the wire 60 provided the impedance is substantially matched to the connecting parts 48,61. Also, the region 59 may be filled with a material other than air, such as a high temperature ceramic material designed for substantially matched impedance. Alternatively, the conductor 50 may have a conductive portion protruding upwardly which connects to the conductor 64. Other conductive connecting interfaces may be used to connect the spark plug assembly 61 to the sensing assembly 48 if desired.

The spark plug assembly 61 may be a K Connector®, Part No. K102F made by Wiltron or an equivalent 50 ohm connector. The assembly 61 is about 8 mm long and has an outer diameter Ds1 of about 5 mm. The assembly 61 is secured by the screw threads 55 into the upper portion of the outer conductor 56. The assembly 61 comprises an outer conductor (or spark plug) 62, a center conductor 64, a cylindrical conductor bead 66, which is slid into and in electrical contact with the spark plug 62, and an insulator 68 between the center conductor 64 and the conductor bead 66. The spark plug assembly 61 is designed to maintain an impedance which substantially matches that of the coaxial cable 12 (i.e., 50 ohms). The center conductor 64 is cylindrical and an upper portion 65 of the conductor 64 protrudes about 5 mm upwardly from the bead 66 and the insulator 68.

A region 69 around the protruded portion 65 between the portion 65 and an inner diameter Ds2 of the spark plug 62 is air. The inner diameter Ds2 is about 3 mm. Materials other than air may be used if desired provided the impedance is matched. Also, the center conductor 64 is hollow at each end to provide insertion holes 63,67 for connection to other conductors. The lower insertion hole 63 of the conductor 64 has the wire 60 inserted therein and the upper insertion hole 67 has a center conductor 70 of the coaxial cable 12 inserted therein. Other lengths, shapes, dimensions, and diameters of the spark plug assembly 61 or any portion thereof may be used if desired.

The coaxial cable 12 comprises the center conductor 70 surrounded by an electrical insulator 72. The insulator 72 is surrounded by an electrically grounded shield conductor 74 which is surrounded by an outer insulator 75. A portion of the shield 74 is folded over the outer insulator 75 and an end cap 80 is secured to the shield 74 and to the end of the cable 12. The end cap 80 has an insulating portion 81, which the conductor 70 passes through, and a conductive portion 83. The conductive portion 83 of the end cap 80 has a flange 82 extending radially therefrom and a nut 84 is rotatably mounted to the flange 82. Also, there is a conductive washer 85 disposed on the end cap 80 and connected to the conductor 70. The threaded inner portion of the nut 84 is screw threaded onto the threaded upper outer portion of the spark plug 62 by the screw threads 55. When the coaxial cable 12 is connected to the sensor 10, the conductor 70 extends into the upper insertion hole 67 of the protruding portion 65 of the conductor 64. The drawing in FIG. 2 is not to scale.

The impedance seen by the coaxial cable 12 from the conductor 70 to the inner conductor 50 is substantially 50 ohms.

Instead of the sensing assembly 48, the spark plug assembly 61 and the connecting wire 60, any other configurations, dimensions, shapes, and materials to that described herein may be used to make up the sensor 10 or any portion(s) thereof provided it is a coaxial microwave transmission media having an impedance substantially matched to that of the coaxial cable 12.

Referring now to FIGS. 1 and 2, the clearance/thickness circuit 14 provides the microwave excitation (or transmitted) signal 30, e.g., a transverse electromagnetic (TEM) wave, which is launched into the center conductor 70 of the coaxial cable 12 which is electrically connected to the center conductor 50 of the sensing assembly, as discussed hereinbefore. The transmitted electromagnetic wave 30 reaches the end of the conductor 50 (FIG. 2) and electric field lines 76 extend from the end of the conductor 50 to the outer conductor 56 and to the seal 18, both of which are at ground potential. Based on the impedance seen by the electromagnetic wave 30 at the end of the conductor 50 a certain amount of electromagnetic energy will be reflected back into the conductor 50 and along the coaxial cable 12 and back to the clearance/thickness circuit 14. This return or reflected electromagnetic wave is indicated by the line 32 (FIG. 1).

The clearance/thickness circuit 14 (FIG. 1) measures the change in phase difference between the transmitted electromagnetic wave 30 and the reflected wave 32 and provides output signals on lines 15 indicative of the air-path clearance G and/or the thickness D of the seal 18 (discussed more hereinafter).

Figure 3:
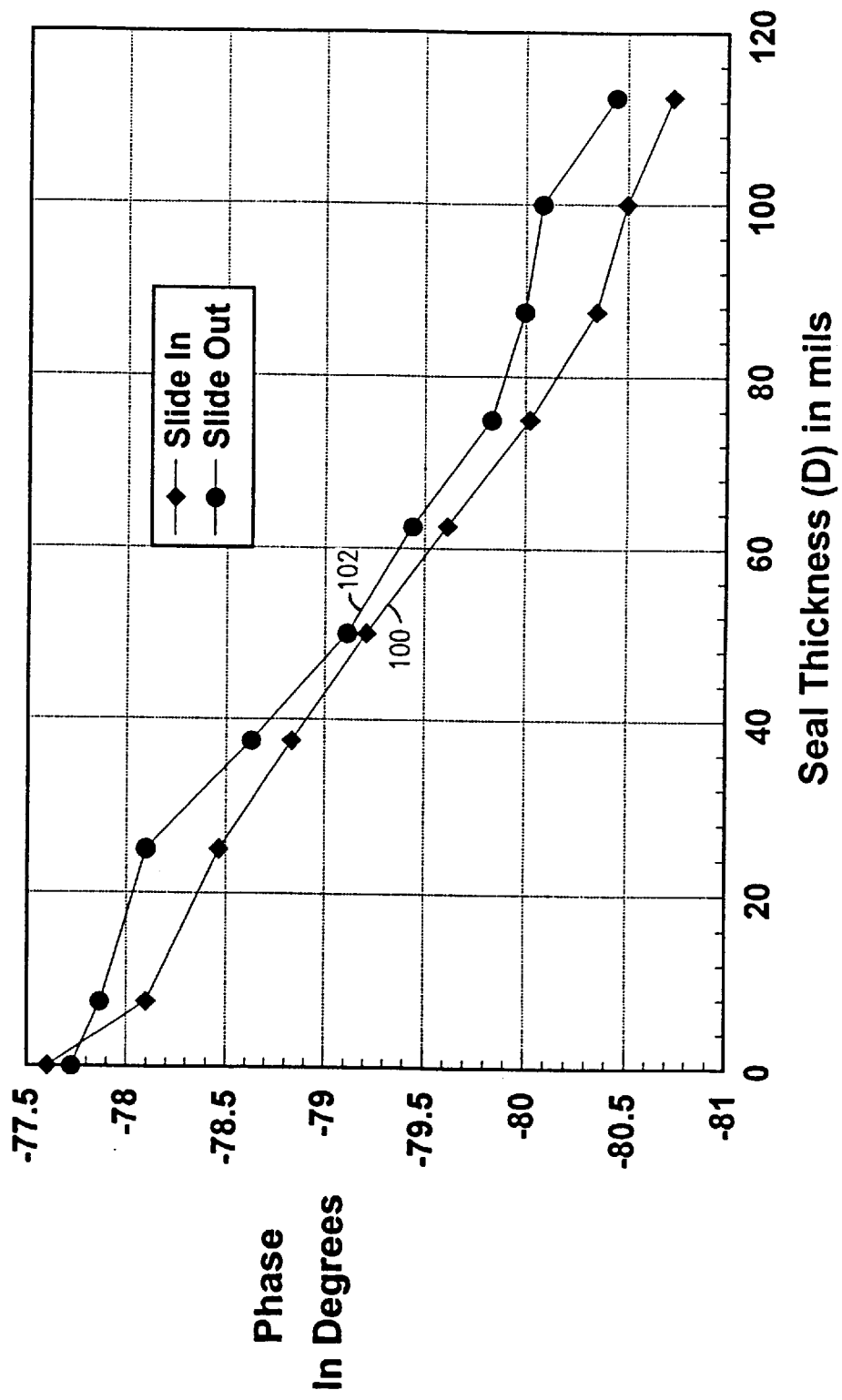
FIG. 3 is a graph showing a difference in phase between reference and reflected microwave signals versus the seal thickness, in accordance with the present invention.

Referring now to FIG. 3, when no blade is in front of the sensor 10, the terminal impedance depends upon the seal thickness D. In particular, we have found that as the seal 18 thickness D decreases (i.e., the seal becomes thinner) e,g, due to wear, the terminal impedance seen by the end of the conductor 50 changes and, as such, the phase difference between the two waves 30,32 also changes. We have also found that, as the seal 18 wears (i.e., the thickness D decreases), the phase change is approximately linear as indicated by a curve 100. The curve 100 was obtained by sliding the sensor 10 toward the inner surface 28 of the seal 18, thereby simulating decreased seal thickness D. Also, we have found that if the seal 18 were to grow instead of shrink (in a different type of application), the measurement is substantially bi-directional as indicated by a curve 102. The curve 102 was obtained by sliding the sensor assembly 10 away from the blades 26, thereby simulating increased seal thickness D. The curve for FIG. 3 was obtained using an excitation frequency of 20 GHz. The curves 100,102 show a change in phase difference of about 3 degrees over a change in seal thickness of about 0.112 inches (0.284 cm). Because existing microwave phase measurement devices can measure changes in phase differences of less than about 0.1 degrees, the invention provides sufficient measurement accuracy and sensitivity of air-path clearance. A typical range of values for the air-path clearance G is about 0 to 0.140 inches (0.355 cm) and the accuracy typically required for such clearance is about +/−0.001 inches (0.0254 mm). Also, other microwave frequencies may be used if desired from that shown herein, e.g., 1 to 40 GHz.

As the curves 100,102 of FIG. 3 are for when no blade in front of the sensor 10, the invention may be used when the blades 26 are either not moving or spinning very slowly, i.e., when the engine is not operating.

Alternatively, the invention may be utilized when the engine is operating. In that case, phase difference measurement is synchronized with the blade passing such that seal wear measurement data is not taken or is ignored when the blade 26 is in front of the sensor 10. Blade synchronization rejects the phase differences associated with the impedance when the blade is in front of the sensor 10. Blade synchronization may be accomplished in many different ways, for example, using synchronous detection which is locked to the blade passing frequency. The blade passing frequency may be derived from either the impedance measurement, the reflection signal, phase measurements, or independently from a blade passing sensor or from a tachometer which indicates the speed of the blade passing (discussed more hereinafter).

Referring now to FIG. 1, in addition to determining the seal thickness D, the air path clearance G may be determined by measuring the distance D2 from the sensor 10 to the blade 26.

More specifically, when the blade 26 is in front of the sensor 10, as indicated by the dashed line 90 (FIG. 1), the impedance seen by the conductor 50 (FIG. 2) of the sensor 10 is substantially a short circuit and the blade 26 (FIG. 1) reflects energy into the waveguide due to changes in the terminal impedance. As a result, the phase difference between the transmitted and reflected waves 30,32 varies with the blade distance D2 between the sensor 10 and the blade tip 24, as is known. Accordingly, the distance D2 can be measured using known microwave phase difference measurement techniques such as those described in U.S. Pat. No. 4,384,819 entitled "Proximity Sensing" to Baker, and Great Britain Patent No. 127748, entitled "Improvements In or Relating to Proximity Sensing Apparatus" to D. W. Temple.

When the blade is not in front of the sensor 10, the thickness D of the seal 18 may be measured as discussed hereinbefore. Accordingly, knowing the distance D2 from the sensor 10 to the blade tip 24 and the thickness D of the seal 18 allows the calculation of the air-path clearance G between the blade tip 24 and the inner surface of the seal 18 by subtracting D from D2 (i.e., G=D2−D).

Figure 4:
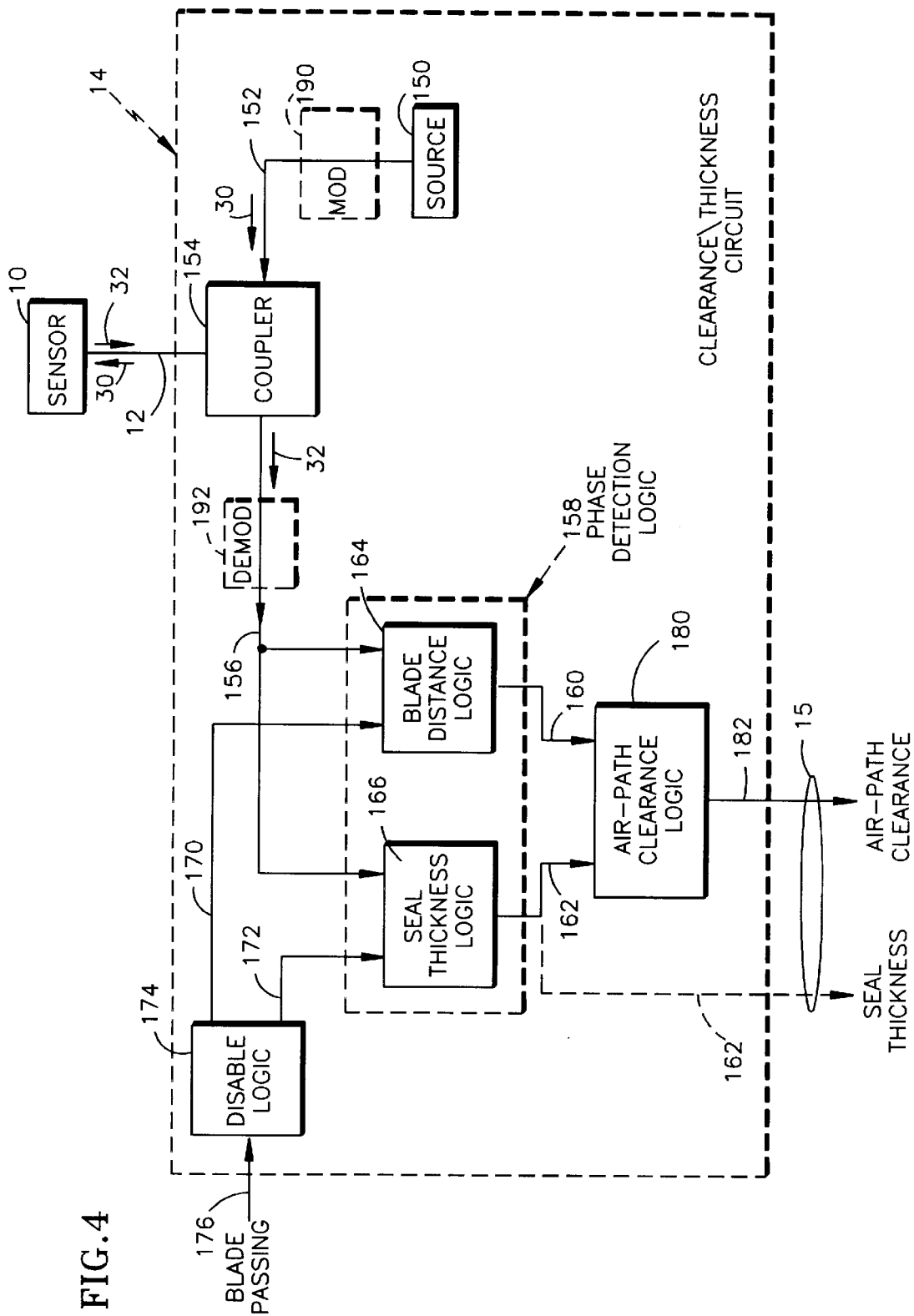
FIG. 4 is a schematic block diagram of one embodiment of the clearance/thickness circuit of FIG. 1, in accordance with present invention.

Referring now to FIG. 4, the clearance/thickness circuit 14 may comprise a microwave source 150, e.g., a coherent, low phase noise source, which provides the microwave excitation signal 30 on a line 152 to a microwave coupler 154, such as a microwave circulator. The coupler 154 couples the microwave signal 30 onto the coaxial cable 12 which is connected to the sensor 10. Also, the coupler 154 receives the reflected signal 32 on the cable 12 and couples it to a line 156. For optimal performance, the coupler 154 should exhibit minimal back reflection of the return signal 32 from the coupler 154 toward the sensor 10. The line 156 is fed to phase detection logic 158 which receives the reflected microwave signal 32 and, using standard microwave phase measurement techniques, provides a blade distance signal on a line 160 indicative of the sensor-to-blade distance D2 and a seal thickness signal on a line 162 indicative of the seal thickness D.

Also, the phase detection logic 158 may comprise blade distance logic 164 and seal thickness logic 166. The blade distance logic 164 and the seal thickness logic 166 may be combined as a single circuit or be separate circuits if desired.

The logics 164,166 may be any standard microwave circuits capable of determining microwave phase differences based on the terminal impedance of the coaxial cable 12, such as those discussed in U.S. Pat. No. 4,359,683, entitled "Microwave Interferometer", to Chivers, and Great Britain Patent No. 1277748, entitled "Improvements In or Relating To Proximity Sensing Apparatus", to D. W. Temple. Also, portions of the clearance/thickness circuit 14 may be similar to or the same as a microwave network analyzer, such as Model No. HP8510B Network Analyzer by Hewlett Packard.

To provide blade synchronization, the phase detection logic 158 also receives disable signals on lines 170 and 172 from disable logic 174. The disable logic 174 receives a blade passing signal on a line 176 indicative of when the blade 26 is in front of the sensor 10. When the blade 26 is in front of the sensor 10, the disable logic 174 provides a seal thickness disable signal on the line 170 which is a logic high. Otherwise the seal thickness disable signal is a logic low. When the blade passing signal on the line 176 indicates that the blade 26 is not in front of the sensor 10, the disable logic 174 provides a blade distance disable signal on the line 172 which is a logic high. Otherwise, the blade distance disable signal is a logic low. The disable signals on the lines 170,172 are mutually exclusive.

When the seal thickness disable signal on the line 172 is active (or high), the seal thickness logic 166 is disabled. Otherwise, the logic 166 is enabled. Similarly, when the blade distance disable signal on the line 170 is active (or high), the blade distance logic 164 is disabled. Otherwise, the logic 164 is enabled. When the logic 166 or the logic 164 is disabled, spurious signals are prevented from affecting the calculations for that logic.

The lines 160 and 162 are fed to air-path clearance logic 180 which calculates the air-path clearance G (i.e., D2−D), which is provided on a line 182. Alternatively or in addition to providing an air-path clearance signal, the clearance/thickness circuit 14 may provide the seal thickness signal on the line 162 as an output signal.

The phase detection logic 158 may likely be precalibrated with a reference phase (or time) signal which is measured from the end of the coaxial cable. Thus, as changes to phase (or reflection time) occur, they will occur from the reference point set during calibration. Also, errors due to changes in the cable 12 may be cancelled when calculating the airgap clearance G because both D2 and D are measured and subtracted.

It should be understood that while matching the impedance of the sensor 10 to the cable 12 and matching all the internal impedances within the sensor 10 provides optimal performance and sensitivity, the system will still work if there is some amount of impedance mismatch. The greater the mismatch, the greater the reflection and the lower the signal-to-noise ratio. The amount of allowable mismatch varies for each application.

Also, to reduce the effects of electronic noise, a known electronic microwave modulator 190 may be provided at the output of the source 150 to modulate the excitation signal 30 on the line 152. In that case, a known synchronous demodulator (or detector) 192 would also be provided at the output of the coupler 154 to demodulate the return signal 32 on the line 156. The modulation circuit 190 may likely be provided within the source 150, and the demodulation circuit 192 may likely be provided within the phase detection logic 158.

Also, it should be understood that portions of the clearance/thickness circuit 14 may be implemented by a digital computer in software. Also, all the functions of the circuit 14 may be implemented by a single electronic circuit or some or all of them may be implemented by a plurality of separate circuits.

Also, it should be understood that a plurality of sensors may be distributed around the annulus of an engine to provide clearance sensing of multiple points.

Further, it should be understood that while the invention has been described as being used on a gas turbine engine, the invention may be used with any device or machine having protruding elements such as blades or teeth and an adjacent abradable seal or liner which are movable relative to each other and where the detection of clearance therebetween is desirable. Thus, the elements may move, the seal may move, or both may move relative to each other. Also, the elements may be located within, outside of, or parallel to the seal surface.

Furthermore, the invention need not detect air-path clearance but may detect solely the seal thickness and may be used as a seal thickness measurement device. In that case, the blade distance logic 164 and the air-path clearance logic 180 would not be needed and the sole output of the logic 14 would be the seal thickness signal on the line 162.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An air-path clearance sensor for a machine having protruding elements and an adjacent abradable seal, which are movable relative to each other, there being an air-path clearance between the seal and the elements and an element distance between the sensor and the elements, and the sensor being recessed within the seal by a recess distance, comprising:

signal processing means, for providing a microwave transmission signal;

transmission means, electrically connected to said signal processing means and having a characteristic impedance, for propagating said microwave transmission signal;

sensor means, electrically connected to said transmission means, having an impedance substantially matched to said characteristic impedance of said transmission means, for receiving said transmission signal and for providing a reflected microwave signal onto said transmission means indicative of the recess distance when the elements are not in front of said sensor means;

said transmission means propagating said reflected microwave signal; and said signal processing means comprising means for receiving said reflected microwave signal and for providing an electrical signal indicative of the recess distance.

2. The sensor of claim 1 wherein said reflected microwave signal from said sensor means is indicative of the element distance when the movable elements are in front of said sensor means; and said signal processing means comprises means for providing an electrical signal indicative of the air-path clearance.

3. The sensor of claim 1 wherein said transmission means comprises a coaxial cable.

4. The sensor of claim 1 wherein said sensor means comprises a spark plug assembly, a sensing assembly and a conductive connecting interface therebetween.

5. An air-path clearance sensor for a machine having protruding elements and an adjacent abradable seal, which are movable relative to each other, there being an air-path clearance between the seal and the elements and an element distance between the sensor and the elements, and the sensor being recessed within the seal by a recess distance, comprising:

signal processing logic which provides a microwave transmission signal;

transmission medium, electrically connected to said signal processing logic and having a characteristic impedance, for propagating said microwave transmission signal;

a sensor, electrically connected to said transmission medium, having an impedance substantially matched to said characteristic impedance of said transmission medium, for receiving said transmission signal and for providing a reflected microwave signal onto said transmission medium indicative of the recess distance when the elements are not in front of said sensor;

said transmission medium propagating said reflected microwave signal; and said signal processing logic receiving said reflected microwave signal and providing an electrical signal indicative of the recess distance.

6. The sensor of claim 5 wherein said reflected microwave signal from said sensor is indicative of the element distance when the movable elements are in front of said sensor; and said signal processing logic providing an electrical signal indicative of the air-path clearance.

7. The sensor of claim 5 wherein said transmission medium comprises a coaxial cable.

8. The sensor of claim 5 wherein said sensor comprises a spark plug assembly, a sensing assembly and a conductive connecting interface therebetween.

* * * * *